(12) United States Patent
Cyr

(10) Patent No.: US 8,200,001 B2
(45) Date of Patent: Jun. 12, 2012

(54) QUANTITATIVE METHOD FOR EVALUATION OF FIBER TEAR ASSOCIATED WITH REMOVAL OF A FIRST LAYER THAT WAS ADHERED TO A SECOND LAYER

(75) Inventor: Brian Clarence Cyr, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 582 days.

(21) Appl. No.: 12/500,286

(22) Filed: Jul. 9, 2009

(65) Prior Publication Data

US 2011/0007965 A1 Jan. 13, 2011

(51) Int. Cl.
G06K 9/00 (2006.01)
(52) U.S. Cl. .......................................... 382/141; 382/100
(58) Field of Classification Search .................. 382/100, 382/141
See application file for complete search history.

(56) References Cited

U.S. PATENT DOCUMENTS

| 7,014,182 B2 | 3/2006 | Marsh | |
| 7,603,074 B2* | 10/2009 | Yamaguchi | 399/408 |
| 7,694,947 B2 | 4/2010 | Marsh | |
| 7,738,830 B2* | 6/2010 | Isamikawa et al. | 399/408 |
| 7,854,581 B2* | 12/2010 | Kubo et al. | 412/29 |
| 2004/0119278 A1* | 6/2004 | VanDeWalle et al. | 281/21.1 |
| 2004/0141830 A1* | 7/2004 | Yoshie et al. | 412/1 |
| 2007/0172283 A1* | 7/2007 | Kurohata | 400/76 |
| 2009/0102110 A1* | 4/2009 | Endoh et al. | 270/1.01 |
| 2010/0176583 A1* | 7/2010 | Reiter | 281/35 |

\* cited by examiner

*Primary Examiner* — Bhavesh Mehta
*Assistant Examiner* — Utpal Shah
(74) *Attorney, Agent, or Firm* — Gibb & Riley, LLC

(57) ABSTRACT

A method is provided for quantitatively evaluating fiber tear associated with removal of a cover that was adhered to a spine of bound pages of at least one book. The method includes optically imaging the spine of each book from which the cover was removed and generating a corresponding at least one digital image, and processing the images using a tangible processor executing image processing software. The processing includes selecting regions of the images that have a color which corresponds to a range of colors associated with a selected level of fiber tear, assigning a selected color to the selected regions which is contrasting relative to the colors of non-selected regions of the at least one image, selecting at least a portion of the images to analyze, and determining a percentage of the selected portion that is assigned the selected color.

19 Claims, 3 Drawing Sheets

QUANTITATIVE METHOD FOR EVALUATION OF FIBER TEAR ASSOCIATED WITH REMOVAL OF A FIRST LAYER THAT WAS ADHERED TO A SECOND LAYER

BACKGROUND

The present disclosure relates generally to evaluation of fiber tear associated with removal of a first layer that was adhered to a second layer. In particular, the present disclosure relates to evaluation of fiber tear associated with removal of a cover that was adhered to a spine of bound pages of a book.

Perfect bookbinding includes stacking the pages to be bound so that the pages are aligned with the edges forming an even surface. In a first exemplary method the stacked and bound pages are designated for a single perfect-bound book, and in a second exemplary method the stacked bound pages are designated for a plurality of perfect-bound books.

In accordance with the first exemplary method an adhesive is applied to the surface formed by the edges that is to be the spine. The cover is immediately adhered to the spine by applying an adhesive to the spine and applying pressure so that the cover properly adheres to the spine.

In the second exemplary method, the individual books may be separated from one another once the adhesive used for binding the pages has dried. An adhesive is applied to the surface formed by the edges that is to be the spine. A layer of material may be adhered to the spine for additional stability. Once the adhesive used to bind an individual set of bound pages is dried and the pages are separated, if necessary, from the other bound pages, the cover is adhered to the spine by applying an adhesive to the spine and/or the cover and applying pressure so that the cover properly adheres to the spine.

The quality of the adhering of the cover to the spine may be affected by a variety of conditions present during the process of binding the cover to the book, such as the temperature of the adhesive, the thickness of the adhesive used, the pressure applied once the cover is placed on the spine, and the duration of time that the pressure is applied. The quality of cover to spine adhesion can be evaluated by removing the cover from the spine after it was fully adhered and evaluating the degree of fiber tear present. Currently, the evaluation of the fiber tear is based on a visual inspection of the spine.

SUMMARY

The present disclosure is directed to a method for quantitatively evaluating fiber tear associated with removal of a cover that was adhered to a spine of bound pages of a book. The method includes optically imaging the spine of each book from which the cover was removed, and generating at least one corresponding digital image. The digital image(s) are processed using a tangible processor executing image processing software. Using the tangible processor, and based on the processing, a percentage of a selected portion of the at least one image associated with a selected level of fiber tear is determined.

The present disclosure is also directed to a method for quantitatively evaluating fiber tear associated with removal of a cover that was adhered to a spine of bound pages of a book. The method includes optically imaging the spine of each book from which the cover was removed, and generating at least one corresponding digital image. The digital image(s) are processed using a tangible processor executing image processing software. Using the tangible processor, and based on the processing, a percentage of a selected portion of the at least one image associated with a selected level of fiber tear is determined.

The present disclosure is also directed to a method for quantitatively evaluating fiber tear associated with removal of a cover that was adhered to a spine of bound pages of at least one book. The method includes optically imaging the spine of each book from which the cover was removed and generating at least one corresponding digital image, and processing the images using a tangible processor executing image processing software. The processing includes selecting regions of the images that have a color which corresponds to a range of colors associated with a selected level of fiber tear, assigning a selected color to the selected regions which is contrasting relative to the colors of non-selected regions of the at least one image, selecting at least a portion of the images to analyze, and determining a percentage of the selected portion that is assigned the selected color.

Other features of the presently disclosed method will become apparent from the following detailed description, taken in conjunction with the accompanying drawings, which illustrate, by way of example, the presently disclosed method.

BRIEF DESCRIPTION OF THE DRAWINGS

Various embodiments of the present disclosure will be described below with reference to the figures, wherein.

DETAILED DESCRIPTION

Figure 1:
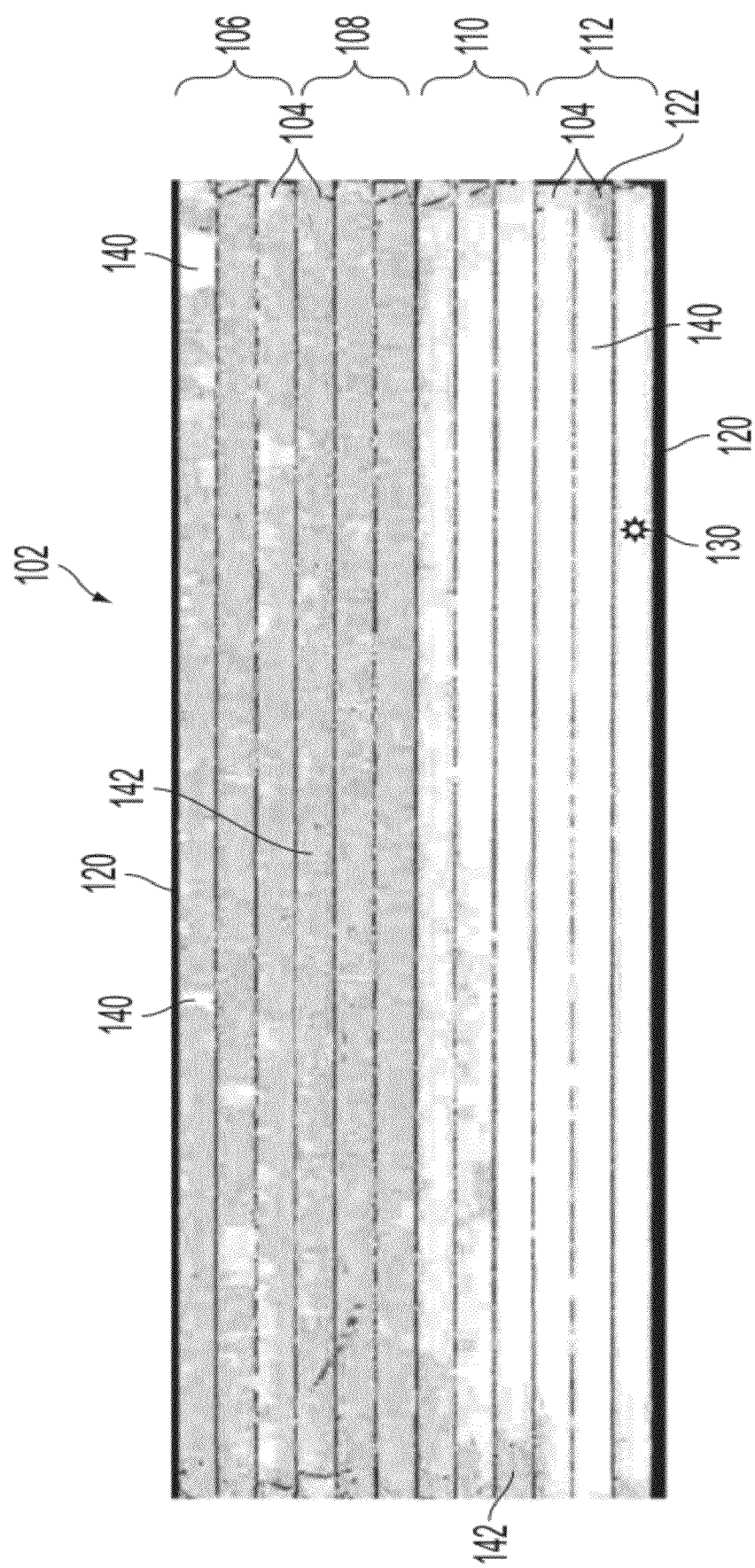
FIG. 1 is an image of the spines of several books that was generated in accordance with the present disclosure.

The present system and method is related to the testing and analysis of percent fiber tear associated with removal of a first layer from a second layer, where the layers were adhered to one another. The application that will be used to describe the system and method is the analysis of fiber tear associated with cover adhesion of soft cover books, known in the industry as perfect bound books. However, other applications are envisioned, such as analysis of fiber tear associated with the removal of a sticker adhered to a product (e.g., packaging, glass, wood, metal, plastic, etc.) or produce (e.g., a vegetable or fruit), a bandage from the skin of an organism, an item having a sticky surface that adheres to a garment (e.g., a name tag sticker or a sanitary napkin), removal of dental appliances adhered to a surface associated with a patient, etc. The testing is systematic, repeatable and utilizes statistical analysis, resulting in a high degree of accuracy. The testing includes acquiring one or more sets of samples.

In the present example, each sample is a book. Each book includes a plurality of pages that are bound together and a cover is applied. In the present example the pages are formed of paper, and the cover is made of a heavier stock paper or cardboard, however the pages and cover may be made of other materials, such as plastic or cloth. The cover may be flexible or it may be rigid. Additionally, in the present invention, the book is a perfectly bound book in which the pages are first bound together via an adhesive, with the bound edges forming a spine. The cover, which is flexible, is then adhered to the spine. Other types of books and methods of forming books are envisioned.

For each set of samples the cover was bound to the pages under particular cover binding conditions, with each sample in the set bound under the same cover binding conditions. Each set may use different cover binding conditions, such as for performing a controlled test, and the analysis of the fiber tear for each set indicates which set uses the optimal cover binding conditions. Examples of cover binding conditions include the temperature of an adhesive used to adhere the cover to the spine of the bound pages, the adhesive thickness employed, the amount of pressure applied, and the duration of time that pressure was applied.

The steps of the present method include removing a first layer from a second layer, imaging one of the layers, processing the image, and determining a percentage of the image associated with fiber tear. More specifically, the step of removing the first layer from the second layer is performed in a uniform manner for each sample so that no new variables or noise are introduced into the evaluation. In the current example, pages of a sample book are clamped by a stationary clamp, and the cover to be removed is clamped by a movable clamp. The cover is removed from the bound pages by moving the movable clamp in a selected direction, which in the current example is selected to be perpendicular to the plane in which a spine of the bound pages lies. The velocity at which the movable clamp is moved, the force applied to the cover to remove it from the bound pages, and the direction in which the movable clamp is moved are each selected to be uniform for every sample that is dismembered.

The step of imaging one of the layers may be performed, for example, by scanning the layer being imaged or acquiring the image using a scanning device or a camera, such as a digital camera, either of which generates a digital image. If the image is an analog image it can be digitized and the digital image produced will be processed in the next step. The layer to be imaged is the layer which is most likely to be indicative of fiber tear. The imaging is performed in a uniform manner for each sample imaged in order not to introduce any new variables or noise into the evaluation.

In the current example, the spine of bound pages associated with each sample is imaged, as fiber tear is most evident on the spine of bound pages. The cover, once removed, is more likely to be damaged or destroyed. The spines of several books may be imaged at one time by stacking the books and imaging the bindings of the stacked books. Since the evaluation includes comparing different sets of books, where the books in each set had their cover bound using the same cover binding conditions, books that belong to the same set may be stacked together so that each book is adjacent to a book of the same set, although this is not a limitation to the current method.

Referring now to the drawing figures, in which like references numerals identify identical or corresponding elements, the method in accordance with the present disclosure will now be described in detail. With initial reference to FIG. 1, an exemplary image used in accordance with the present disclosed method is illustrated and is designated generally as image 102. As shown in FIG. 1, image 102 is digital image of an optical image acquired of the spine of 12 books 104, following removal of respective covers that had been adhered to each of the spines. There are four sets of books 104, each set including three books 104. The sets shown are 106, 108, 110 and 112. The image 102 was generated by the process of scanning or imaging a stack of the books 104 using a scanning device or camera.

In the present example, the stack of books is maintained in a stack. While the books are maintained in the stack, the stack is placed onto the platen glass of a flatbed scanner device with the spines of the bound pages of each book facing the platen glass. The scanner device is operated to scan the book spines. Accordingly, a single digital image is generated that corresponds to the scanning of the stack of books 104. In this way, the image of each book spine is acquired in a uniform manner. Alternative methods of scanning the spines of the books 104 include scanning the books 104 or the sets 106, 108, 110 and 112 individually, or grouped in any fashion desirable. Multiple digital images may be generated and analyzed to determine the percentage of fiber tear. The analysis may include combining or comparing images of the multiple digital images.

Other methods for imaging the book spines may be used, such as imaging each book separately or imaging each set separately. Additionally, the imaging may be performed by a device other than a scanner device, such as an analog or digital camera. An analog image may be then converted into a digital image. The imaging must be done under uniform conditions without introducing variables into the evaluation, and accordingly, the photographing must be done in a light controlled environment. Variables such as lighting, distance from the imaging device to the book spine being imaged, focus, exposure, etc., must be uniform. The scanner device inherently provides such uniformity. As described above, the book spines being evaluated may be imaged in more than one image, and the term image 102 as used herein refers to the images acquired collectively of the book spines being evaluated.

The step of processing the image 102 includes preparing the image 102 for processing, including cropping portions of the image 102 that it is not desirable to process, namely portions of the image 102 that do not correspond to a book spine. In image 102, gray portions 120 are cropped and removed as well as area 122 to which adhesive was not applied.

The image is further prepared for processing by eliminating very small or minor unwanted artifacts that might have an undesirable impact on results of the evaluation. Such minor artifacts may include shadows, e.g., of pieces of fiber that were removed from the cover, a stray strand of hair or speck of dirt. One method for removing these unwanted artifacts is to average a color associated with each pixel or selected pixels with the color of surrounding pixels. Other methods for removing unwanted artifacts are known in the art. Commercially available image processing software programs, such as Adobe Photoshop™, CorelPhoto-Paint™, Jasc™ PaintShop Photo™, Ulead PhotoImpact™, provide tools for processing images, wherein the tools may include a blurring tool that can be employed to remove the unwanted artifacts. The degree of blurring, such as the radius of pixels whose colors are averaged, may be selectable. Accordingly, the degree of blurring may be determined empirically to see which radius yields the best results.

The image 102 shows areas 140 in which there was excellent fiber tear. Areas having excellent fiber tear appear white in the image 102. An area that has excellent fiber tear is an area in which there is no visible glue, but substantially only paper fiber removed from the cover. FIG. 1 shows areas 142 of the image 102 in which there was poor fiber tear, in which glue is visible and no or few fibers from the cover are present. The imaged glue residue has some color to it, the color depending on the glue used. Typically the color has a yellow hue. In black and white FIG. 1, areas 142 associated with poor fiber tear are shown as shaded.

The processing of the image further includes providing a reference point 130 by creating or selecting the reference point 130. Once the reference point 130 is created or selected it is used to differentiate areas or assist in differentiating areas of the image 102 that are associated with excellent fiber tear and areas that are not. In the current example, a reference point 130 is created that is associated with excellent fiber tear. Since an area that has excellent fiber tear in the image 102 has a very white color, the reference point 130 is created by selecting a small area or point on the image 102 using a selecting tool provided by the image processing software and using the image processing software to assign it a very white color, which in the current example is has a color value of (255, 255, 255) on the RGB color scale and represents pure white. In Adobe Photoshop™, this can be done by selecting a small rectangle using the marquee tool and using the paintbrush tool to assign it a color of pure white. The reference point 130 may be located near a corner or an edge of the image 102. Since the created reference point 130 has a known color, a reference point 130 having the same color can be created for subsequent images 102 associated with subsequent scans. Thus there is uniformity and consistency between images 102 associated with different scans.

Instead of creating the reference point 130 by assigning it a color, the reference point 130 may be selected by finding a small area of pixels that is very close or the closest to pure white and selecting that area of pixels. The reference point 130 may be located on a portion of the image 102 that is associated with a particular book 104. In order to provide uniformity of the reference point 130 among multiple images 102, if more than one image 102 is evaluated, the book 104 associated with the reference point 130 may be included with the books 104 scanned in each image 102 and the same reference point 130 may be used for all of the images 102.

Alternatively, the reference point 130 may be assigned a color or selected to have a color that is associated with poor fiber tear, such as a color having a yellow hue. The color can be selected in accordance with the color of the glue and fibers. The selection may be made empirically or in accordance with a recommended value associated with the type of glue used. The reference point 130 in this case is used to select portions of the image 102 that are associated with poor fiber tear.

Once the reference point 130 is selected and its color is known, the image processing software is instructed to find and select other regions of the image 102 that have the type (e.g., excellent or poor) of fiber tear associated with the reference point 103. The result is that first and second regions are created within image 102, where one region has excellent fiber tear and the other region has poor fiber tear which is indicated by the presence of glue in the image 102. In the present example, the image processing software selects all regions in the image 102 that have a color that is within a tolerance range of the color of the reference point 130. The tolerance range may be selected empirically or a recommended value may be used. The tolerance range should be suitable for differentiating between the colors that are included in the image 102 that are associated with excellent fiber tear and poor fiber tear.

Figure 2:
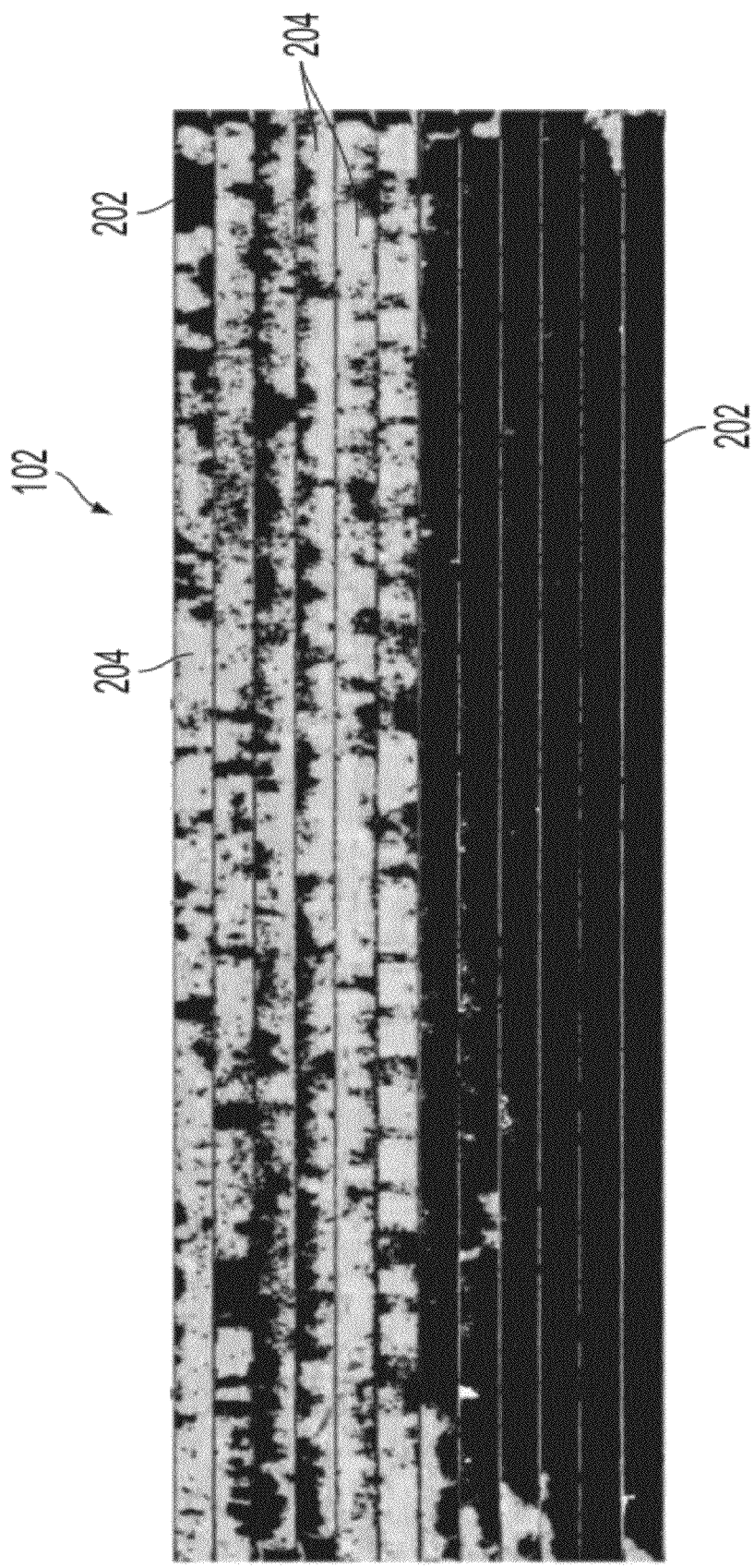
FIG. 2 is the image shown in FIG. 1 following image processing that was performed on the image in accordance with the present disclosure.

Once the regions having a color within the tolerance range of the reference point 130 are selected, they are assigned a color, such as black, that has a high contrast relative to the unselected regions. If the selected regions are associated with excellent fiber tear, then the unselected regions have a yellowish color. If the selected regions are associated with poor fiber tear, then the unselected regions have a white color. By assigning the selected regions to be a color that has a high contrast to the unselected regions, the two regions can be differentiated and quantified. In the present example, shown in FIG. 2, the selected regions 202 correspond to excellent fiber tear and are assigned the color black, which has an RBG value (0, 0, 0). The unselected regions 201 are yellowish (shown as shaded in gray in the black and white FIG. 2).

A selected portion of the image 102 is then analyzed in order to quantify the percentage of the selected portion that has excellent fiber tear using tools available with the image processing software. The percentage of excellent fiber tear within the selected portion of image 102 is the percentage of the selected portion of the image 102 that is assigned the contrasting color. The selected portion of the image 102 may be the entire image 102, a portion of the image that compares to one of the sets 106, 108, 110 and 112, or a portion of the image that corresponds to a particular spine 104. By analyzing each portion of the image 102 that corresponds to each set 106, 108, 110 and 112 separately, the percentage of excellent fiber tear in each set can be compared. The cover binding conditions for the set having the most excellent fiber tear are then considered to be optimal relative to the cover binding conditions used for the other sets.

Figure 3:
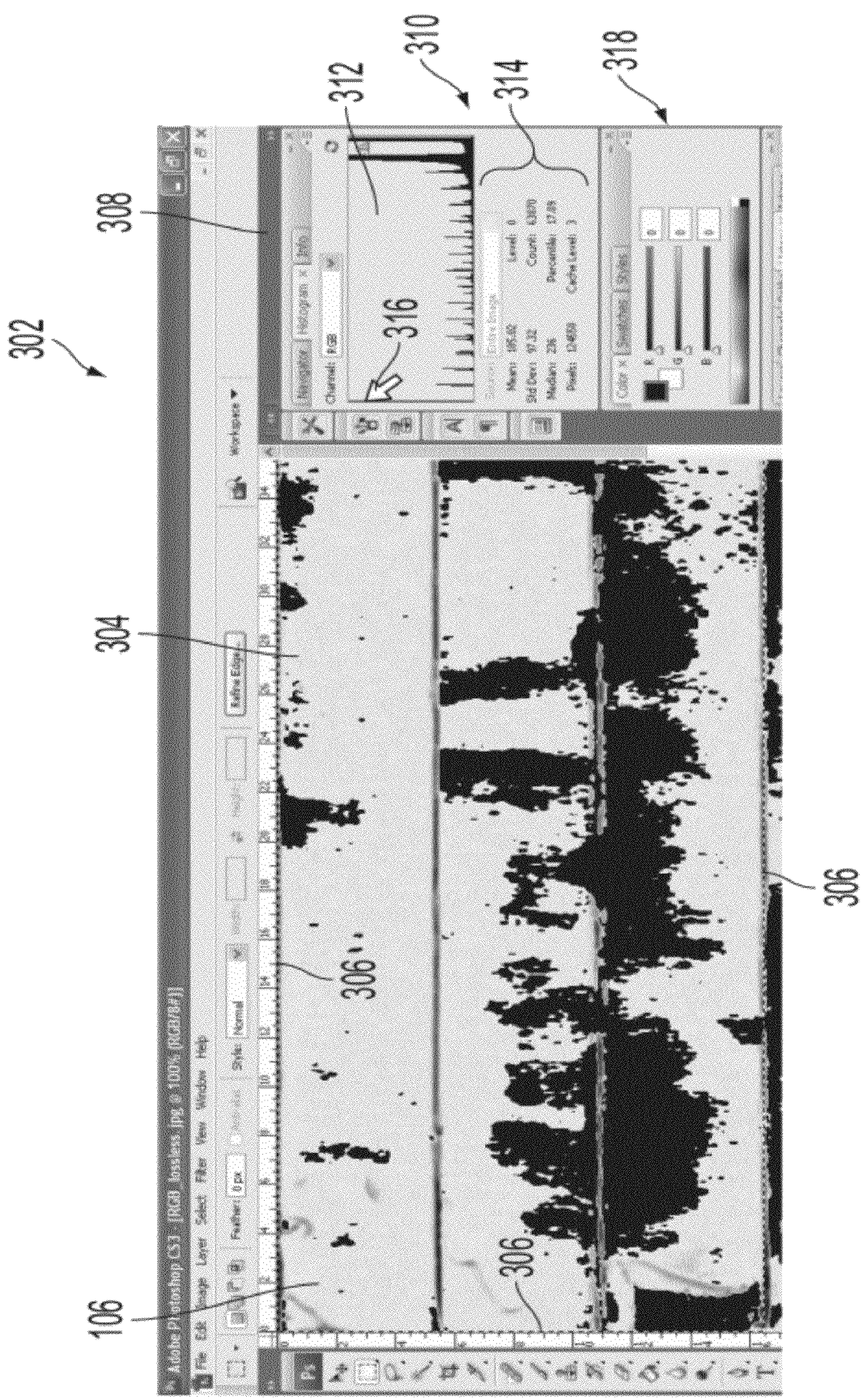
FIG. 3 is a screenshot displayed on a display device of analysis of a selected portion of the image shown in FIG. 2.

FIG. 3 shows a partial screenshot 302 of an exemplary selected portion 304 of image 102 as it is being analyzed by the image processing software. The screenshot 302 is displayed on a display device associated with the processor that is executing the image processing software. The portion 304 was selected using a selection tool 306, such as the rectangular marquee tool provided with Adobe Photoshop™. The selection tool 306 encloses a portion of the image 102 that is to be analyzed using a selected analysis tool of the image processing software. The screen shot 302 also shows an analysis window 308 provided by the image processing software. The analysis window 308 blocks a right end section of the selected portion 304, and portion of the selection tool 306 that encloses that right end section is not viewable. In the current example, the selection tool 306 encloses the entire first set 106 and the entire first set 106 is analyzed by the selected analysis tool.

The analysis window 308 includes two sub-windows. In sub-window 310 a histogram 312 and data area 314 related to the histogram 312 and the selected portion 304 are displayed. The histogram shows a graphical representation of the color space in selected area 306. For example, pixels assigned a color having RGB value (0, 0, 0), are represented in the first bar of the graph and labeled as "Level: 0" in data area 314. Similarly, color having RGB value (255, 255, 255) are represented in the right most column in the graph and labeled as "Level: 255" (not shown in data area 314). The selected analysis tool in the present example allows the user to select a level, representing a color on graph 312, and then determines what percentage of pixels of the selected portion 304 is assigned the selected level. A user may select the selected color by manipulating a position indicator 316, where manipulation of the position indicator is controlled by user operation of a pointing tool device, such as a mouse, joystick or keyboard. In the present example, the user selects the color black, which has an RGB value (0, 0, 0). The selected color and its RGB value are shown in sub-window 318. Data 314 and the histogram 312 indicates that 17.9% of the pixels in the selected portion 304 are assigned the color black having RGB value (0, 0, 0). This percentage represents the percentage of material on the spines of the books 104 in set 106 that indicate excellent fiber tear.

Each set included in image 102 is analyzed by selecting either the entire set or each book 104 in the set. By selecting each book 104 within a set, a standard deviation for the set may be calculated. The percentage of material on the spines associated with excellent fiber for each of the different sets, e.g., sets 106, 108, 110 and 112, is quantified and can be compared. The cover binding conditions used for each set are associated with a quantitative number or score that is indicative of the quality of the cover binding. The analysis is repeatable and the results can be compared to results in future or past analyses. The cover binding conditions used for the set having the highest percentage of spine material associated with excellent fiber tear may be considered the optimal conditions relative to the other sets analyzed. The present disclosed method is useful for controlled experiments in which incremental changes are made to one or more variables related to cover binding conditions and the affect on fiber tear is quantified and correlated to the cover binding conditions. Additionally, the present disclosed method can be used to make predictions with respect to the effect of cover binding conditions on fiber tear.

The steps of the analysis are not limited to the particular exemplary steps described above, the particular colors selected, or the particular image processing analysis tools used. Other colors may be selected or assigned to portions of the image 102, and other image processing analysis tools may be used, provided that either the area of the image 102 associated with excellent fiber tear or poor fiber tear is detected and quantified relative to the total area of the selected portion of the image 102 being analyzed.

Each image processing software includes a series of programmable instructions capable of being executed by a processor. The series of programmable instructions can be stored on a computer-readable medium, such as RAM, a hard drive, CD, smart card, 3.5" diskette, etc., for performing the functions disclosed herein and to achieve a technical effect in accordance with the disclosure. The processor is a tangible processing device that executes the image processing software, has associated memory, display and user input devices, and when executing the image processing software provides means for interacting with a user, such as graphical user interface.

The term "scanner device" as used herein encompasses any apparatus or system that acquires an optical image and converts it into a digital image. A scanner device may be configured, for example, but not limited to, as a flat bed scanner, a mechanically driven scanner, a hand-held scanner, a digital camera scanner, or a multifunction machine.

Results for an experiment including three trials and four sets of books are tabulated in Table 1. The covers of the books in each set were bound under the same set of cover binding conditions. One or more variables associated with the cover binding conditions were altered or incrementally changed between each of the sets so that the cover binding was performed under different conditions for each of the sets. The experiment was performed by scanning the bindings of all of the books in Sets 1-4 after the covers had been removed from the individual books under uniform conditions. The image generated by the scanning was processed by Adobe™ Photoshop™ image processing software. The image was blurred using the Blurring tool provided with Adobe™ Photoshop™, with the radius for the blurring set to one pixel, which was found to be effective in removing minor artifacts. A reference point 130 was selected by locating a point made of just one pixel in the image that had excellent fiber tear exhibited by having a color maximally close to the RGB value (255, 255, 255) relative to other pixels in the image.

Regions of the image that had an RGB value in the range of (255+/−45, 255+/−45, 255+/−45), which is effectively the range of (210-255, 210-255, 210-255) (since the highest RGB value is 255) were selected. The selected area was then assigned a color of black having an RGB value of (0, 0, 0). The Rectangular Marquee tool provided by Adobe™ Photoshop™ was used to select the area of the photo corresponding to each set. The Histogram tool provided by Adobe™ Photoshop™ was used to generate the results listed in Table 1.

As shown in Table 1, there is a minimal amount of variation between the three trials for each of the sets, indicating that the results are highly repeatable. According to the results in Table 1, the cover binding conditions used for Set 4 are optimal relative to all of the sets analyzed in Table 1.

TABLE 1

|  | Trial 1 | Trial 2 | Trial 3 |
| --- | --- | --- | --- |
| Set 1 | 17.09 | 17.37 | 17.24 |
| Set 2 | 9.49 | 9.59 | 9.33 |
| Set 3 | 86.06 | 86.78 | 86.70 |
| Set 4 | 93.47 | 93.29 | 92.50 |

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for quantitatively evaluating fiber tear associated with removal of a cover that was adhered to a spine of bound pages of a book, the method comprising:
   optically imaging for each book the spine from which the cover was removed and generating a corresponding at least one digital image;
   processing the at least one image using a tangible processor executing image processing software; and
   determining, using the tangible processor and based on the processing, a percentage of a selected portion of the at least one image associated with a selected level of fiber tear, where in the selected portion is the entire at least one image or a part of the at least one image.

2. The method in accordance with claim 1, wherein the processing the at least one image includes removing portions of the at least one image that are not affected by the removing of the cover.

3. The method in accordance with claim 1, wherein the processing the at least one image includes removing unwanted minor artifacts from the at least one image.

4. The method in accordance with claim 3, where in the removing unwanted minor artifacts from the at least one image includes performing a blurring function on the at least one image.

5. The method in accordance with claim 1, wherein the processing the at least one image includes selecting regions of the at least one image that have a color which corresponds to a range of colors associated with a selected level of fiber tear.

6. The method in accordance with claim 5, wherein the selecting the regions includes providing a reference point having a color and selecting pixels of the at least one image that have a color within a selected range of the color of the reference point.

7. The method in accordance with claim 6, wherein the determining a percentage further comprises analyzing the selected portion of the at least one image for determining a percentage of the selected portion that is formed of the selected regions.

8. The method in accordance with claim 7, wherein the method further comprising assigning a selected color to the selected regions which is contrasting relative to the colors of the non-selected regions of the at least one image, and wherein the analyzing includes determining the percentage of the selected portion that is assigned the selected color.

9. The method in accordance with claim 1, wherein the method further includes stacking the at least one book after the removing and wherein the optically imaging includes imaging the stacked at least one book.

10. The method in accordance with claim 9, wherein books of the stacked at least one book are held tightly together during the optically imaging.

11. A method for quantitatively evaluating fiber tear associated with removal of a first layer that was adhered to a second layer, the method comprising:
   optically imaging for each sample an area of the first and second layers from which the other layer was removed and generating a corresponding at least one digital image;
   processing the at least one image using a tangible processor executing image processing software; and
   determining, using the tangible processor and based on the processing, a percentage of a selected portion of the at least one image associated with a selected level of fiber tear, where in the selected portion is the entire at least one image or a part of the at least one image.

12. The method in accordance with claim 11, wherein the processing the at least one image includes removing portions of the at least one image that are not affected by the removing.

13. The method in accordance with claim 11, wherein the processing the at least one image includes removing unwanted minor artifacts from the at least one image.

14. The method in accordance with claim 13, where in the removing unwanted minor artifacts from the at least one image includes performing a blurring function on the at least one image.

15. The method in accordance with claim 11, wherein the processing the at least one image includes selecting regions of the at least one image that have a color which corresponds to a range of colors associated with a selected level of fiber tear.

16. The method in accordance with claim 15, wherein the selecting the regions includes providing a reference point having a color and selecting pixels of the at least one image that have a color within a selected range of the color of the reference point.

17. The method in accordance with claim 15, wherein the determining a percentage further comprises analyzing the selected portion of the at least one image for determining a percentage of the selected portion that is formed of the selected regions.

18. A method for quantitatively evaluating fiber tear associated with removal of a cover that was adhered to a spine of bound pages of at least one book, the method comprising:
   optically imaging for each book the spine from which the cover was removed and generating a corresponding at least one digital image; and
   processing the at least one image using a tangible processor executing image processing software, the processing comprising:
      selecting regions of the at least one image that have a color which corresponds to a range of colors associated with a selected level of fiber tear;
      assigning a selected color to the selected regions which is contrasting relative to the colors of the non-selected regions of the at least one image;
      selecting at least a portion of the at least one image to analyze; and
      determining a percentage of the selected at least a portion that is assigned the selected color.

19. The method in accordance with claim 18, wherein the method further includes stacking the at least one book after the removing and wherein the optically imaging includes imaging the stacked at least one book.

\* \* \* \* \*